2 Sheets. Sheet. 1.

Quick, Opie & Farrand
Harvester Rake

No. 74845                    Patented Feb. 25. 1868

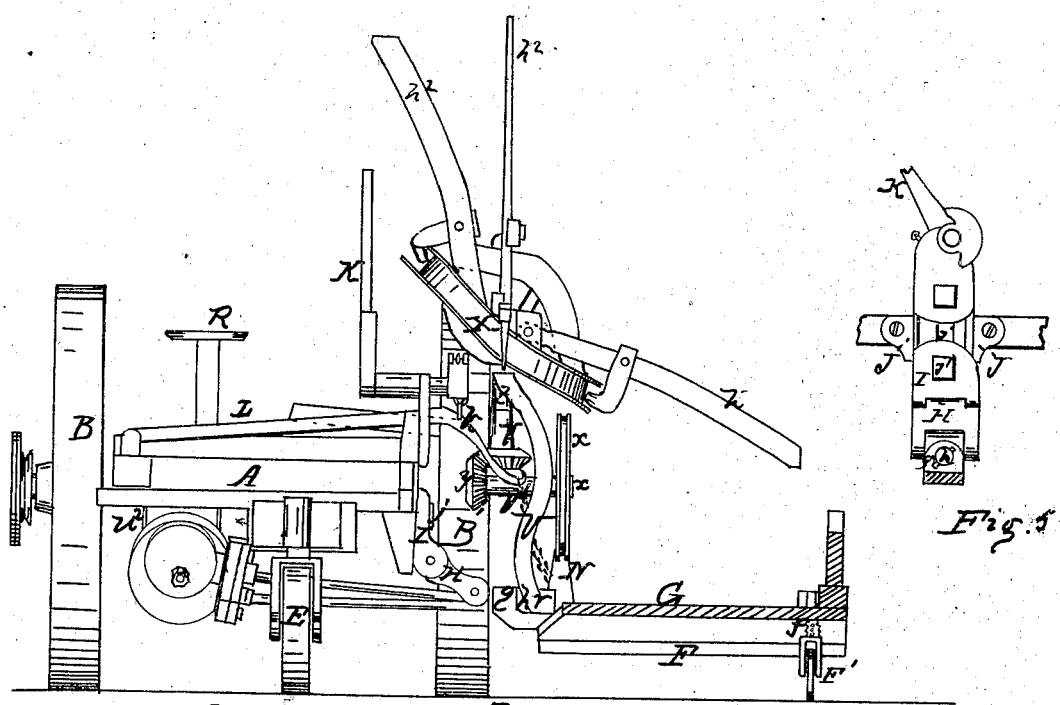
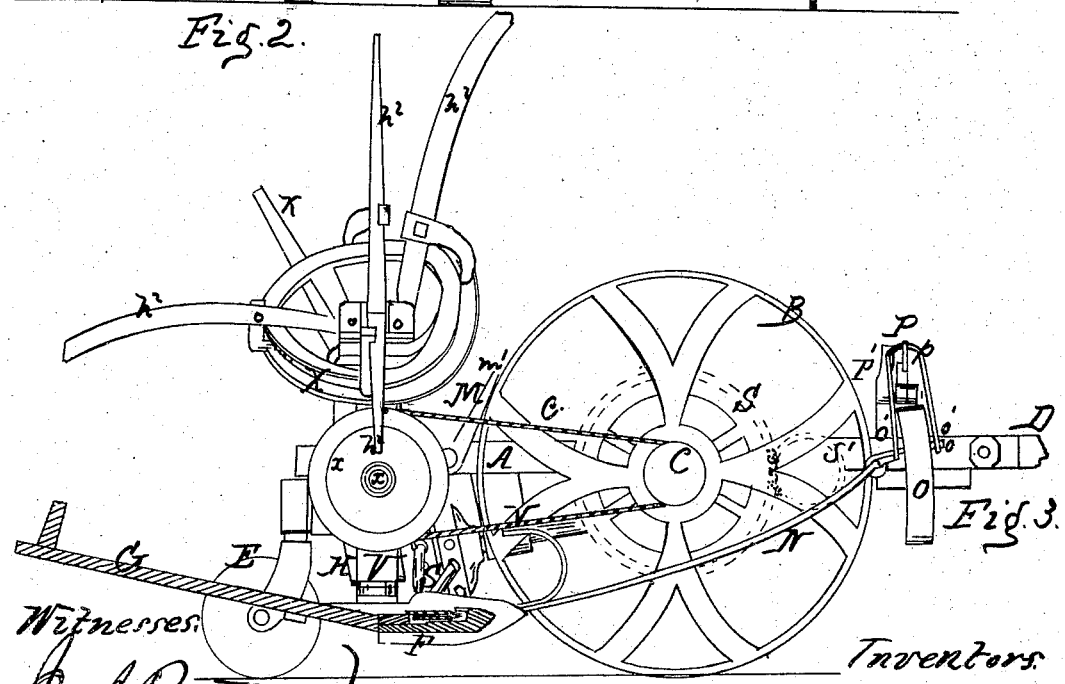

United States Patent Office.

ABRAHAM QUICK, WILLIAM S. OPIE, AND ANDREW J. FARRAND, OF RARITAN, NEW JERSEY.

Letters Patent No. 74,845, dated February 25, 1868.

IMPROVEMENT IN HARVESTER-RAKES.

*The Schedule referred to in these Letters Patent and making part of the same.*

TO ALL WHOM IT MAY CONCERN:

Be it known that we, ABRAHAM QUICK, WILLIAM S. OPIE, and ANDREW J. FARRAND, all of Raritan, in the county of Somerset, and State of New Jersey, have invented a new and useful Improvement in Harvester-Rakes, of which the following is a full, clear, and exact description, reference being had to the accompanying drawings, which make part of this specification, and in which—

Figure 2 represents a view, in elevation, of the same, as seen from the rear.

Figure 3 represents a similar view of the gearing-side of the same, with the plattorm partly in section.

Figure 5 represents a view of the device by which the finger-beam is hinged to the main frame.

Figure 4:
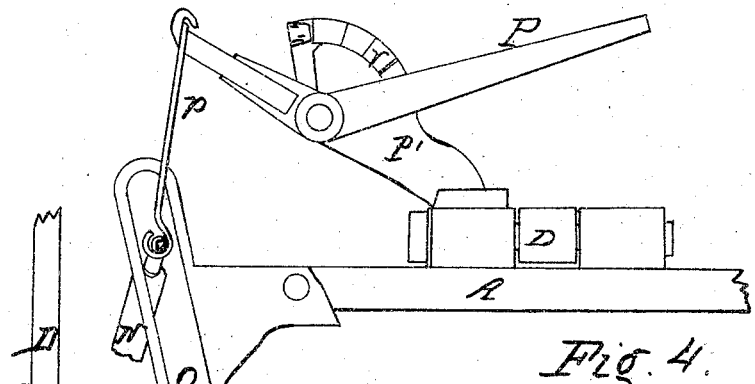
Figure 4 represents a similar view of a portion of the machine, as seen from the front.
Figure 1:
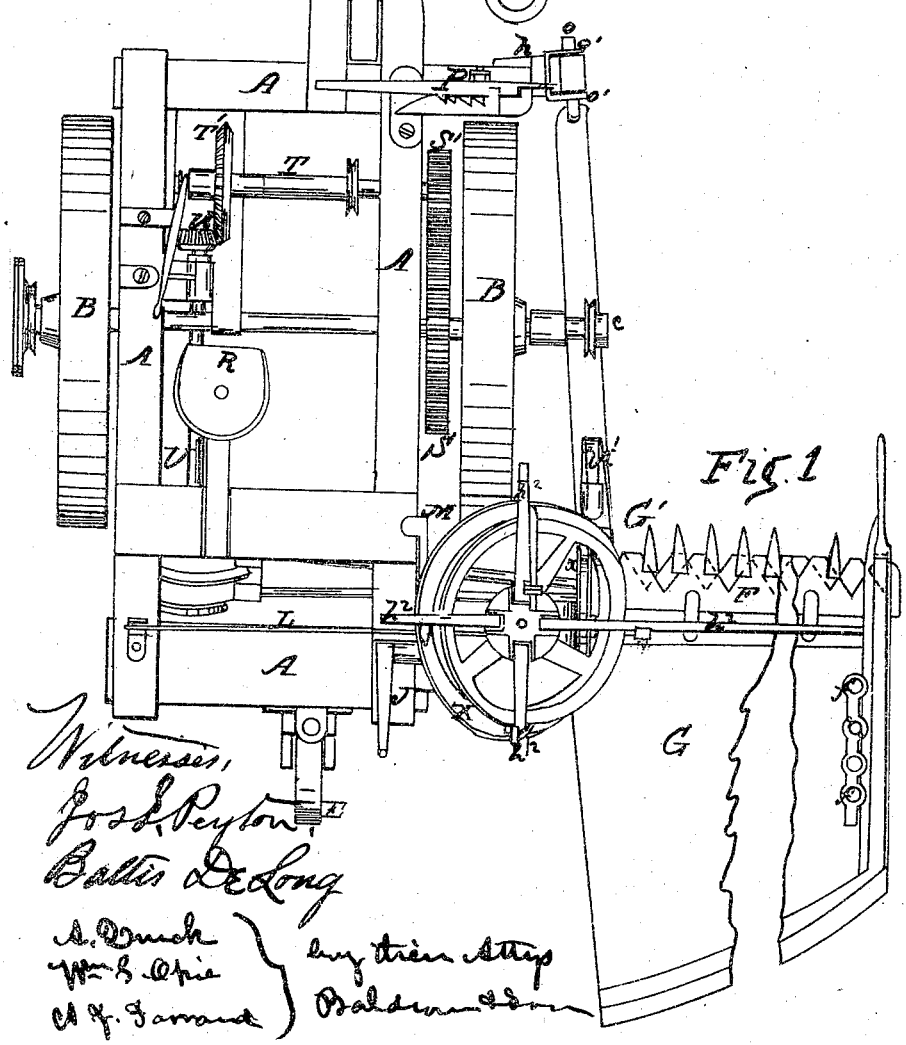
Figure 1 represents a plan or top view of a harvester embracing our improvement.

It is the object of our invention so to combine a rake and reel, rotating on a vertical axis, with a hinged finger-beam, that the rake, while driven from the main axle, is entirely independent of the main frame, and free to conform to the axial rocking of the finger-beam as well as its undulating movements, without impeding the working of the rake or disturbing its relation to the platform; to which end the improvements herein claimed consist in a novel method of mounting a rake and reel, revolving on a vertical axis over the shoe on a standard bolted directly to the inner end of an axially-rocking hinged finger-beam.

In the accompanying drawings, a rectangular main frame, A, is shown, as arranged between two main supporting and driving-wheels, B B, turning loosely on an axle, C, with which they are locked, by suitable backing-ratchets inside the hubs of the wheels. A tongue, D, is hinged to the front of the frame, the rear end of which is supported by a caster-wheel, E. The finger-beam F and platform G are bolted securely to a shoe, G', having a horizontal eye or socket, $g$, in which a pin, $h$, swivels, thus permitting the finger-beam to rock axially to raise or lower the points of the guards. The socket-pin $h$ is pivoted to play vertically in bearings in an intermediately-hinged coupling-arm, H, which is in turn pivoted to play vertically in a bracket, I, which is adjustable vertically in a guide-piece, J, by means of a slot, $j$, and set-screw $j'$, fig. 5. This guide-piece or standard J is bolted securely to the side of the frame, and projects both above and below it. The upper part of this standard sustains the bearing of a lifting-lever, K, connected by a chain, $k$, to a transverse lever, L, which is pivoted at one end to the stubble-side of the frame, and projects inwardly over the heel of the finger-beam, to which it is connected by a chain. A weighted latch or dog, M, is pivoted to play vertically on the inner side of the frame, and rests against the guide J. This dog is in the form of a bell-crank lever. The rear end has notches or steps cut on it to hold up lever L. The dog is released (to lower the finger-beam) by the attendant bearing his weight on the front arm $m'$, and, when released, the preponderance of the rear end causes it to fall back against the guide-piece J again. This lifting-device is, however, used only in mowing, being removed when reaping. A drag-bar, N, extends from the heel of the finger-beam to a slotted strap, O, secured to a projecting beam of the frame in front of the driving-wheel. A pin, $o$, on the front end of the drag-bar, enters eyes $o'$ on a loop, $p$, embracing the strap. The drag-bar is thus free to play vertically in the slot of the strap, and to turn axially. The loop $p$ is attached to a bent lever, P, pivoted to play vertically in a bracket, P', projecting from the frame, and operated by the foot of the driver, who occupies a seat, R, on the frame. This lever is held at any desired elevation by a detent, $r$, on the bracket. This arrangement enables the driver to raise and lower the front end of the drag-bar at pleasure. A spur-wheel, S, on the main axle, drives a corresponding pinion, S', on the countershaft T. A bevel-wheel, T', on this shaft, drives a corresponding pinion, $u$, on a crank-shaft, U, arranged parallel to the driving-wheel and underneath the frame, its rear end being sustained in a solid box resting in a stirrup, $u^2$. The bearing of this box is of the full size of the crank-shaft which passes through it; the advantage of having it solid being that it gives a firm bearing, is cheap to make, and can easily be removed and replaced when worn. The cutters may be driven by a crank and pitman, in the usual way, or by eccentrics, as shown in the drawings.

In this instance we have shown the rake-standard V as cast in the peculiar curved form shown in the drawings, and having a foot, $v$, by which it is bolted directly to the finger-beam. A horizontal journal, $v^1$, is cast with the standard, to support the axle of the driving-pinion, and a vertical journal, $v^2$, to support the rake-shaft, on which suitable rake and reel-arms $h^2$ are pivoted to play vertically, being controlled in their vertical movements by a cam-guide, X, of proper form to give the desired movements to the arms. The cam-guide is bolted to the standard V. The rake is driven by a cord or chain, $c'$, encircling a band-pulley or sprocket-wheel, $c$, on the projecting end of the axle, and a corresponding pulley or sprocket-wheel, $x$, on the axle $x'$, which carries a bevel-pinion, $y$, driving a corresponding pinion, $y'$, on the rake-shaft Y. The grain-side of the platform is supported by a caster-wheel, $F'$, which may be adjusted nearer to or farther from the finger-beam, by means of a series of holes, $f$, in the platform.

Our machine is intended both for mowing and reaping. Its construction and operation as a mower are fully described in an application for Letters Patent, filed by us, March 23, 1867, of which this is a division, and those details need not be repeated here.

For reaping, the lifting-devices K L are removed, and the finger-beam adjusted to the height desired, by raising the bracket I in the socket J, and bolting it there by its set-screw. The raking-devices and platform are then adjusted in position.

In operation, the finger-beam is free to rise and fall at either end, independently of the other and of the main frame, without impeding the working of the rake, or disturbing its relation to the platform. In case the driver desires to depress the guards below the general level at which the cutting is being done, to pick up lodged or fallen grain, for instance, he releases lever P from its detent, and lowers the front end of the drag-bar N, and thus causes the finger-beam to rock axially on its pivot $h$. The chain-carrier $u^2$, being arranged on the drag-bar, conforms to its movements, and keeps the chain from slipping from its pulleys.

What we claim as our invention, and desire to secure by Letters Patent, is—

1. A standard for a revolving rake and reel, with its base bolted directly to the inner end of a finger-beam, having a rocking or rolling axle above the plane of the cutters, between the finger-beam and main frame, whereby the finger-beam can rock axially, without disturbing its relation to the rake.

2. The combination, substantially as described, of a revolving reel and rake with a standard bolted directly to the inner end of an axially-rocking hinged finger-beam, and without support on the main frame.

3. Mounting a rake and reel, revolving on a vertical axis, on a finger-beam hinged to the main frame by three joints, substantially as described.

In testimony whereof, we have hereunto subscribed our names.

ABRAHAM QUICK,
WM. S. OPIE,
A. J. FARRAND.

Witnesses:
FRED. J. FRELINGHUYSEN,
O. B. FRESMER.